United States Patent [19]

Rice

[11] Patent Number: 4,467,461
[45] Date of Patent: Aug. 21, 1984

[54] INTERACTIVE COLOR ANALYSIS OF GEOPHYSICAL DATA

[75] Inventor: George W. Rice; Beverly B. Stebens, both of Ponca City, Okla.

[73] Assignee: Conoco Inc., Ponca City, Okla.

[21] Appl. No.: 222,741

[22] Filed: Jan. 5, 1981

[51] Int. Cl.³ .................. G01V 1/34; G06F 15/36; G03C 5/04
[52] U.S. Cl. ..................... 367/70; 367/110; 367/71; 346/46; 343/5 CD
[58] Field of Search ............ 367/70, 71, 110; 346/46; 343/5 CD; 358/81

[56] References Cited

U.S. PATENT DOCUMENTS

| | | | |
|---|---|---|---|
| 3,662,325 | 5/1972 | Savit | 367/70 |
| 3,781,785 | 12/1973 | Baleb | 364/46 |
| 3,995,312 | 11/1976 | Hubbard et al. | 367/70 |
| 4,070,187 | 1/1978 | Klein et al. | 367/70 |
| 4,169,285 | 9/1979 | Walker | 346/46 |
| 4,210,964 | 7/1980 | Rogers et al. | 367/70 |
| 4,228,529 | 10/1980 | Hsu et al. | 367/70 |
| 4,247,923 | 1/1981 | Koh | 367/110 |
| 4,279,026 | 7/1981 | Lambright et al. | 367/70 |

FOREIGN PATENT DOCUMENTS

| | | | |
|---|---|---|---|
| 54809 | 10/1974 | Australia | 367/70 |
| 1417553 | 12/1975 | United Kingdom | 346/46 |

OTHER PUBLICATIONS

Grossling, "Color Mimicry . . . Geophysics", 4/69, pp. 249–254, Geophysics, vol. 34, #2.
Taner et al., "Complex Seismic Trace Analysis", 6/79, pp. 1041–1063, Geophysics, vol. 44, #6.
Smith et al., "Computer Graphics in Geophysics", 10/72, pp. 825–838, Geophysics, vol. 37, #5.
Balch, "Color Sanograms . . . Data Interpertation", 12/71, pp. 1074–1098, Geophysics, vol. 36, #6.

Primary Examiner—Nelson Moskowitz
Attorney, Agent, or Firm—William J. Miller

[57]. ABSTRACT

Method and apparatus for concurrently and interactively displaying a selected plurality of measurable properties of geophysical data to empirically derive the best combined presentation of the selected attribute properties for interpretation. The technique of the present invention allows the interpreter to more easily comprehend simultaneous variation of several geophysical data attributes and to relate the effects to a specific end result for the geophysical indicators of interest. In accordance with the method, the one or more geophysical attribute variables are quantified and then rasterized so that the data is represented as a gridded variable area display wherein color intensity of the grid units is some function of the instantaneous variable. The resulting data is then loaded into digital refresh memory of an image processing computer whereupon it us interactively mixed for analysis in accordance with operator selected colors and color intensity weighting.

31 Claims, 17 Drawing Figures

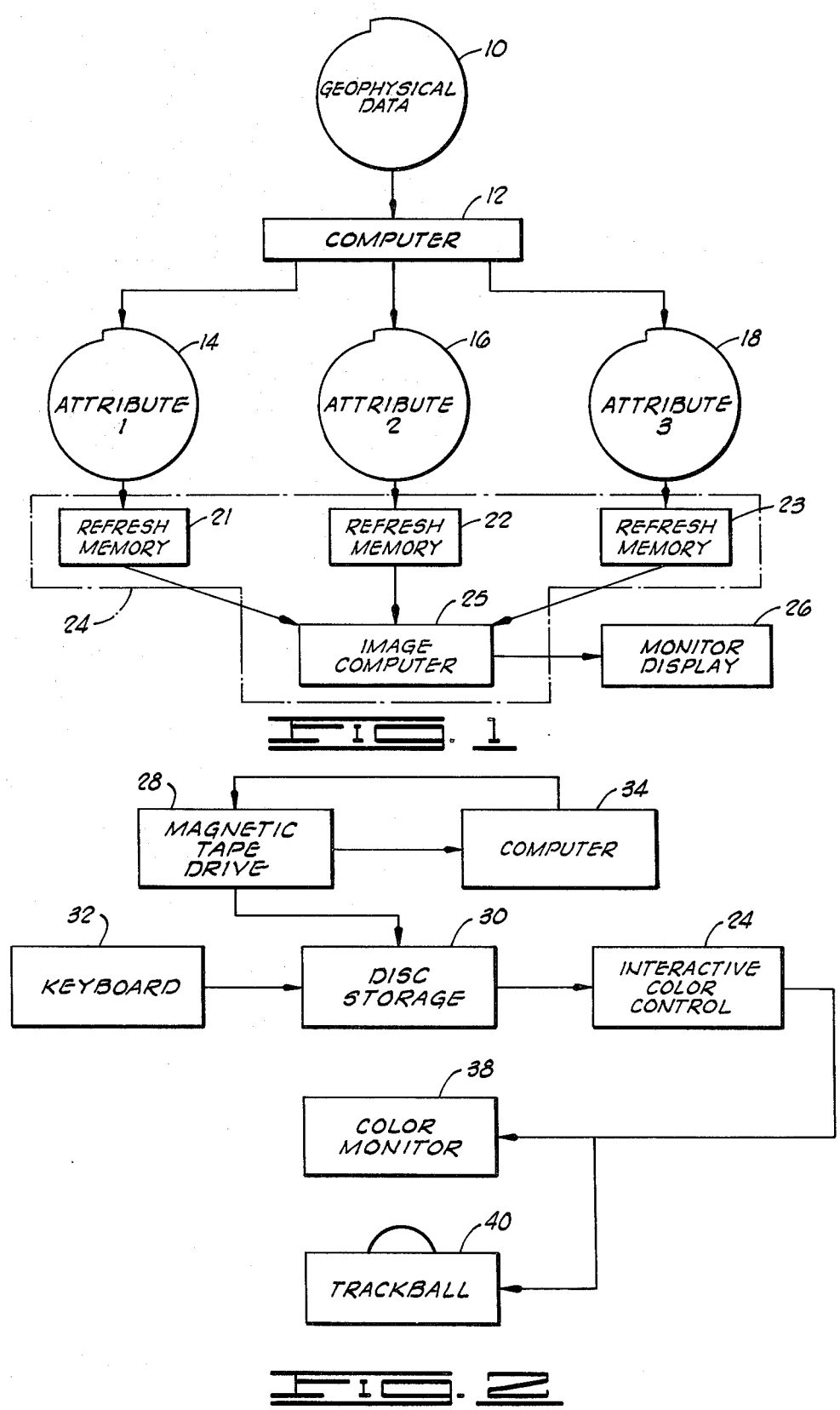

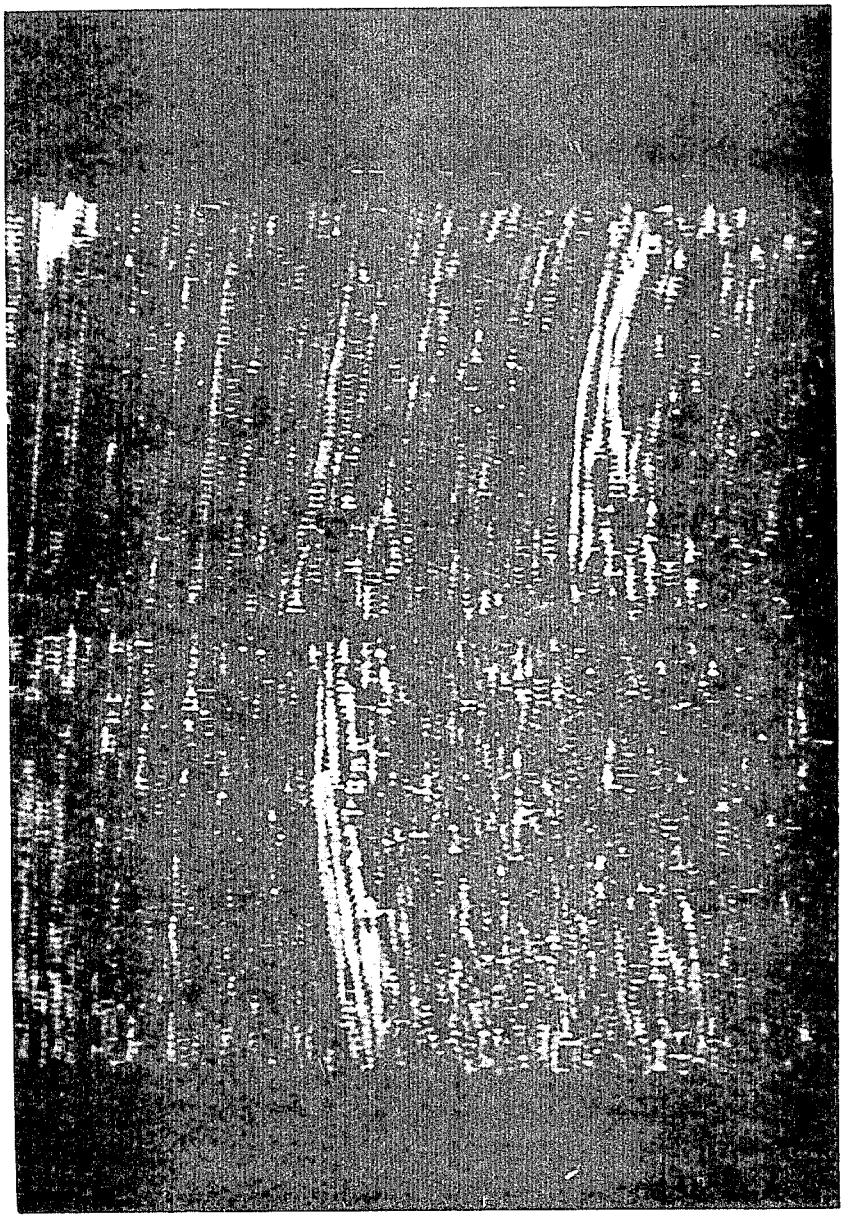

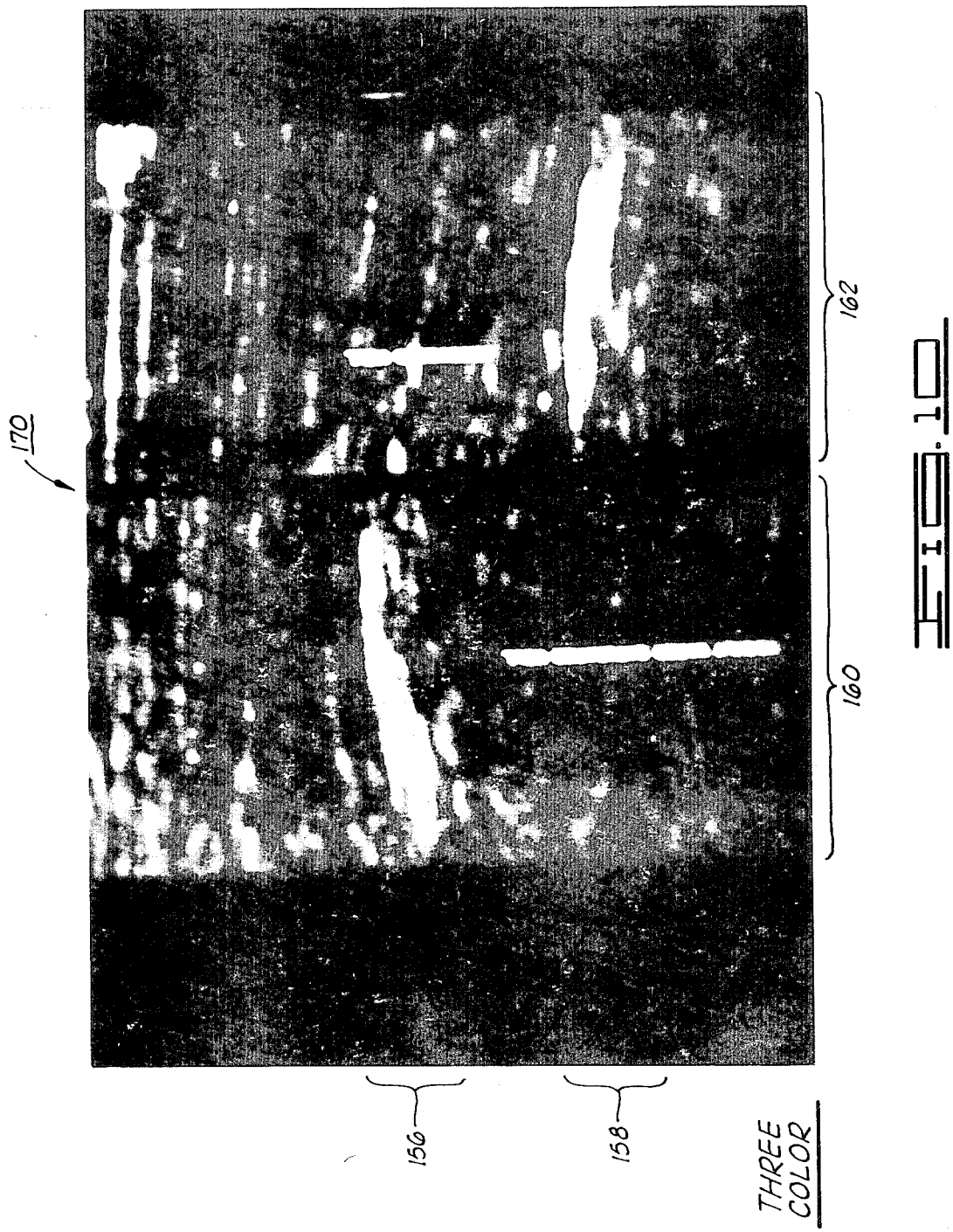
FIG. 10  THREE COLOR

THREE COLOR

INTERACTIVE COLOR ANALYSIS OF GEOPHYSICAL DATA

BACKGROUND OF THE INVENTION

1. Field of the Invention

The invention relates to interpretational display of geophysical data and, more particularly, but not by way of limitation, it relates to an improved method for interactive analysis and display of related multiple properties of geophysical data.

2. Description of the Prior Art

The prior art includes isolated instances of attempts to increase the interpretation yield of such as seismic data through the use of variable color analysis. U.S. Pat. No. 2,944,620 teaches a frequency diversity approach wherein frequencies are assigned to data in accordance with intrinsic values in the direction of stratum thickness, and selected colors are recorded in accordance with band width of frequency to display the amount of frequency band energy present in the display. This approach effectively attempts to isolate particular frequency band widths of interest, and then with assignation of selected colors per band width the output is displayed to provide a basic energy indication. U.S. Pat. No. 3,662,325 teaches the selection of one or more intrinsic or extrinsic values of seismic data and the assigning of a selected color to each of the values. Thereafter, the data values are displayed in color overlay with color intensities directly varied by the intrinsic or extrinsic property data values, as they are assigned a selected color.

SUMMARY OF THE INVENTION

The present invention relates to improvements in color presentation of selected geophysical data values thereby to achieve a final output display having greater informational content for the interpreting geophysicist. The present invention processes one or more parametric attributes of geophysical data, e.g. seismic data, exploration and delineation ore body data and the like, and converts each data set into a unitary pixel array in two dimensions for output on a visual display. The individual pixel arrays then exhibit the selected data property in variable pixel coverage and intensity that is related to the particular property and represented in a selected color mix. A plurality of properties, each in a different selected color, or mix, may then be combined in overlay and empirically varied to provide interactive color effects which are decisive of certain geophysical properties and propensities.

Therefore, it is an object of the present invention to provide a method for interactive color display which yields increased information to the interpreter.

It is also an object of the present invention to provide a versatile color analysis tool which can be utilized with varying forms of dimensionally related geophysical data.

It is still further an object of this invention to provide a color analysis tool having increased flexibility of usage and assignment of interpretive functions.

It is yet another object of the invention to provide a seismic data interpretation method wherein the operator can change the output display both dynamically and interactively to empirically resolve a best data indication.

Finally, it is an object of the present invention to provide a method for concurrently displaying several measurable properties of geophysical data while allowing the interpreter to adjust interactively and visualize simultaneous variation of several variables while empirically relating such effects to hydrocarbons, mineral occurrence or other indicators of interest.

Other objects and advantages of the invention will be evident from the following detailed description when read in conjunction with the accompanying drawings which illustrate the invention.

BRIEF DESCRIPTION OF THE DRAWINGS

FIG. 1 is a flow diagram illustrating the method for interactive color display of geophysical data;

FIG. 2 is a unit block diagram showing interconnection of equipment utilized for interactive color display;

FIG. 9 is a blue color display of the selected portions of the seismic section of FIG. 6;

FIG. 10 is a three color display of the selected portions of the seismic section of FIG. 6;

DETAILED DESCRIPTION OF THE INVENTION

Figure 3:
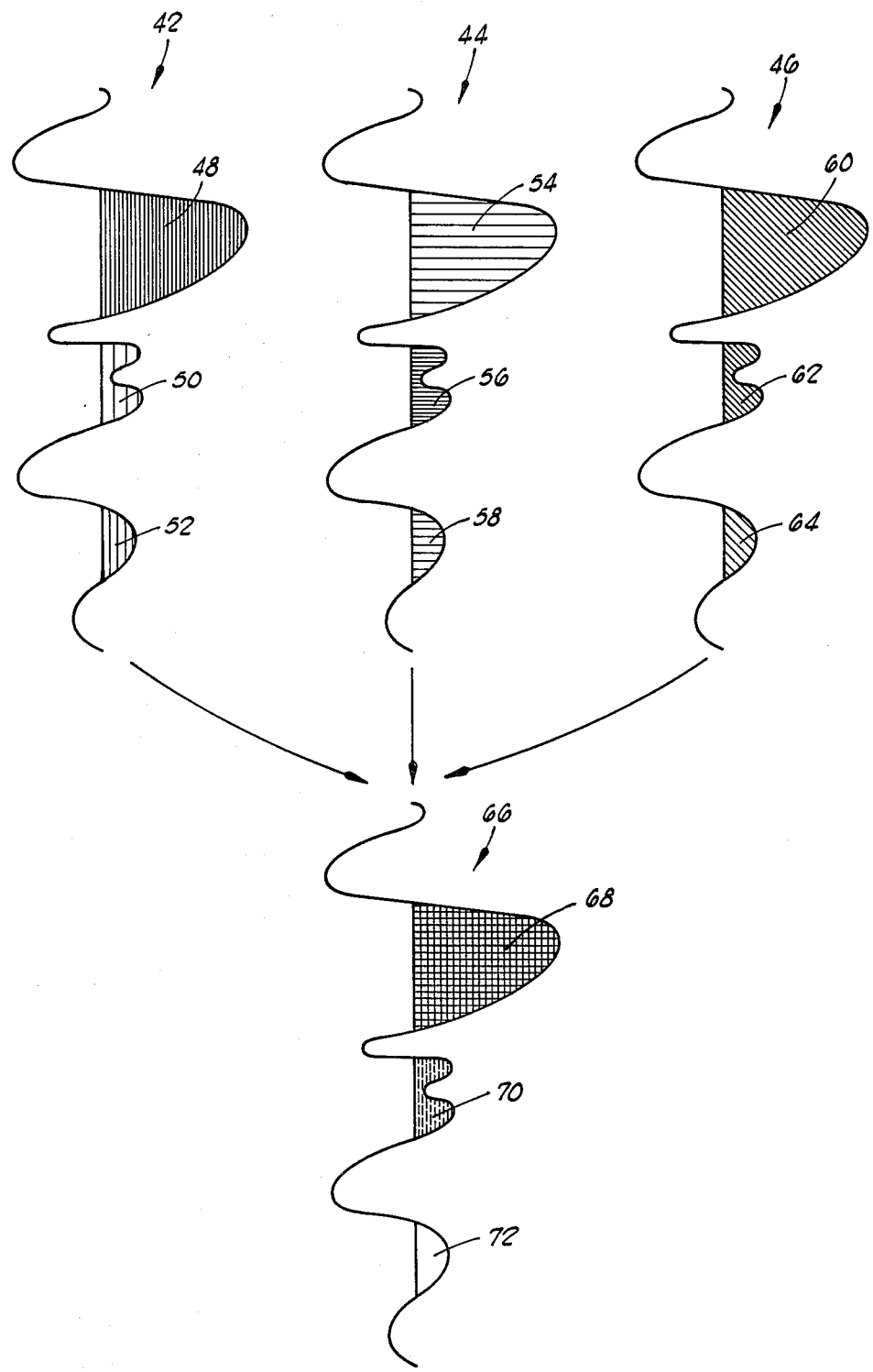
FIG. 3 is an idealized illustration showing three colored attributes of a seismic wave as combined into an interactive colored wave.

Referring to FIG. 1, the technique of the present invention allows the interpreter to more easily comprehend the simultaneous variation of several geophysical data variables in order to relate the effects of hydrocarbon or mineral occurrence, or other geophysical indicators of interest. More specifically, the method relates to quantifying one or more geophysical variables and assigning the quantified area under corresponding data values a gradation that is some function of the variable. The resulting quantified data is then loaded into digital refresh memory of a color display system, as will be further described, as each data variable is assigned to a selected channel of refresh memory for as many variables or channels as are present in the total data compilation. The refresh memory channel can then be interactively applied to the red, green, and/or blue color guns of a standard television color monitor, and the data may be further varied via look-up tables, combining logic and other function processes present in the image processing computer.

As shown in FIG. 1, the selected geophysical trace data as compiled in the field for the particular exploration undertaking is available on tape 10. Such taped trace data as on tape 10 is compiled as a matter of standard procedure in seismic and other mineral logging exploration undertakings, and is readily available in pre-processed and digitized form for use in the present system. Tape 10 containing the geophysical data is then input to a selected form of computer 12 to undergo rasterization, as will be further described below. The rasterized data output of selected attributes or properties of the data are then output for storage in one or more of attributes tapes 14, 16 and 18 whereupon they are ready for interactive introduction to the display. The selected attributes may be any of the selected parameters or property values of the input data; for example, in the case of seismic data input, the variables might be amplitude, frequency, envelope (energy), phase, instantaneous velocity, etc.

The individual trains of rasterized data values or attributes may then be selectively applied to the refresh memories 21, 22 and 23 of interactive color control 24. The outputs of refresh memories 21–23 are then processed through image computer 25 and applied to a monitor display 26. The monitor display 26, and the application of rasterized data from the refresh memories 21–23, is further subject to operator selectivity, as will be further described below.

Referring to FIG. 2, the technique of the present invention is presently practiced utilizing a Hewlett-Packard magnetic tape drive 28 which receives input of the pre-processed geophysical data as it functions in coaction with standard disc storage 30 (Hewlett-Packard) and input keyboard 32 (Hewlett-Packard). The magnetic tape drive 28 also functions with the computer 34 which is programmed for rasterization to specifically format the data for the remainder of the imaging system. The rasterizing computer 34 is the Control Data Corporation Model 174, known as CYBER, as it functions to provide rasterized information of the selected data parameters back to magnetic tape drive 28 for recall to disc storage 30. Output from disc storage 30 is then applied to the interactive color control 24, the I²S Model 70 Image Process Computer, International Imaging Systems, which functions in coaction with a standard color monitor 38 and track ball control pointer 40. The color monitor with track ball may be such as the Modell 5411 as available from CONRAC, Covina, Calif.

FIG. 3 illustrates in idealized form a variable area display wherein the traces are shaded with an intensity that is proportional to the attributes. Thus, and by way of example, seismic data wave forms 42, 44 and 46 may represent seismic energy amplitude, instantaneous frequency and approximate interval velocity, respectively, for a selected event series. That is, each pixel in each shaded area of wave forms 42–46 is a function of that respective parameter of the seismic energy. It should be understood too that the individual pixels, normally square or rectangular in shape, would be of very high resolution in this depiction, but if resolution were reduced to two or three pixels per maximum amplitude, there would be a two or three stair-step slope to each of the maximum amplitude shaded areas and lesser pixel indications for the lower amplitude areas. Thus, the amplitude function curve 42 illustrates a deep red shading 48 followed by a light red shading 50 and a medium red shading 52. The instantaneous frequency data or curve 44 would be rasterized as a light blue rasterization 54 followed by a dark blue shading 56 and a medium blue shading 58. Finally, the green gun information of rasterized curve 46 would show a dark green pixel combination 60 followed by a dark green lesser peak 62 and a light green peak 64. The color composition of the three attribute color lines 42, 44 and 46 would then reproduce as pixel array 66 with yellow pixel pattern 68, violet pixel pattern 70 and white pixel pattern 72.

Figure 4:
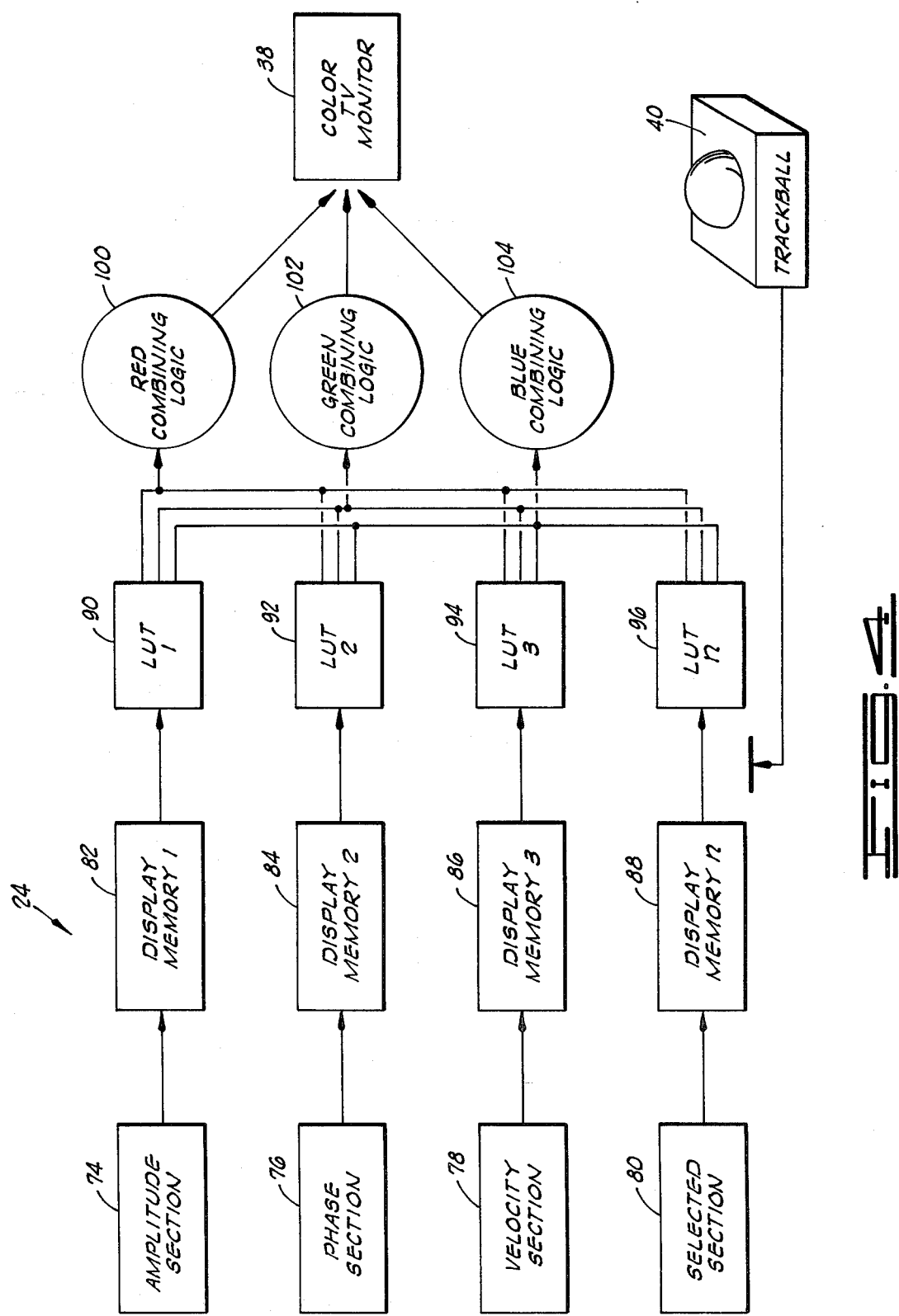
FIG. 4 is a block diagram of equipment utilized in carrying out interactive color display.

FIG. 4 illustrates the manner in which three or more of the selected digital variables can be loaded into the refresh memory of color control 24, and then interactively colored by the operating interpreter by transformation such as track ball linear mapping, variable color space assignment, etc. Thus, the refresh memories include input of, for example, a rasterized amplitude section 74, a rasterized phase section 76, a rasterized velocity section 78, and a rasterized additional section or more, if desired, as illustrated by position 80. In this case we are dealing with seismic sectional trace information as preprocessed by conventional seismic processes for the respective attributes and then rasterized through the computer 34 (FIG. 2) for the operative placement in the disc storage 30 as the rasterized attribute digital data tapes.

The rasterized attribute data 74–80 is then available at display memory 82, display memory 84, display memory 86 and display memory 88 (refresh memories) of the color control 24. The color control 24 also includes look-up tables 90, 92, 94–96 which receive input of the attribute data from respective display memories 82–88. The look-up tables 90–96 function under operator control in conjunction with a track ball 40 to apply linear or non-linear transforms thereby to apply selective weighting to selected ones of the attribute data. Once again, under front panel control, outputs from the respective look-up tables 90–96 are applied to selected ones of the red combining logic 100, the green combining logic 102 and the blue combining logic 104. The combining logics for the respective primary colors 100–104 are also located in the image computer and their respective outputs are then applied to the color TV monitor 38 for final presentation of the interactive color image in rasterized form.

Figure 5:
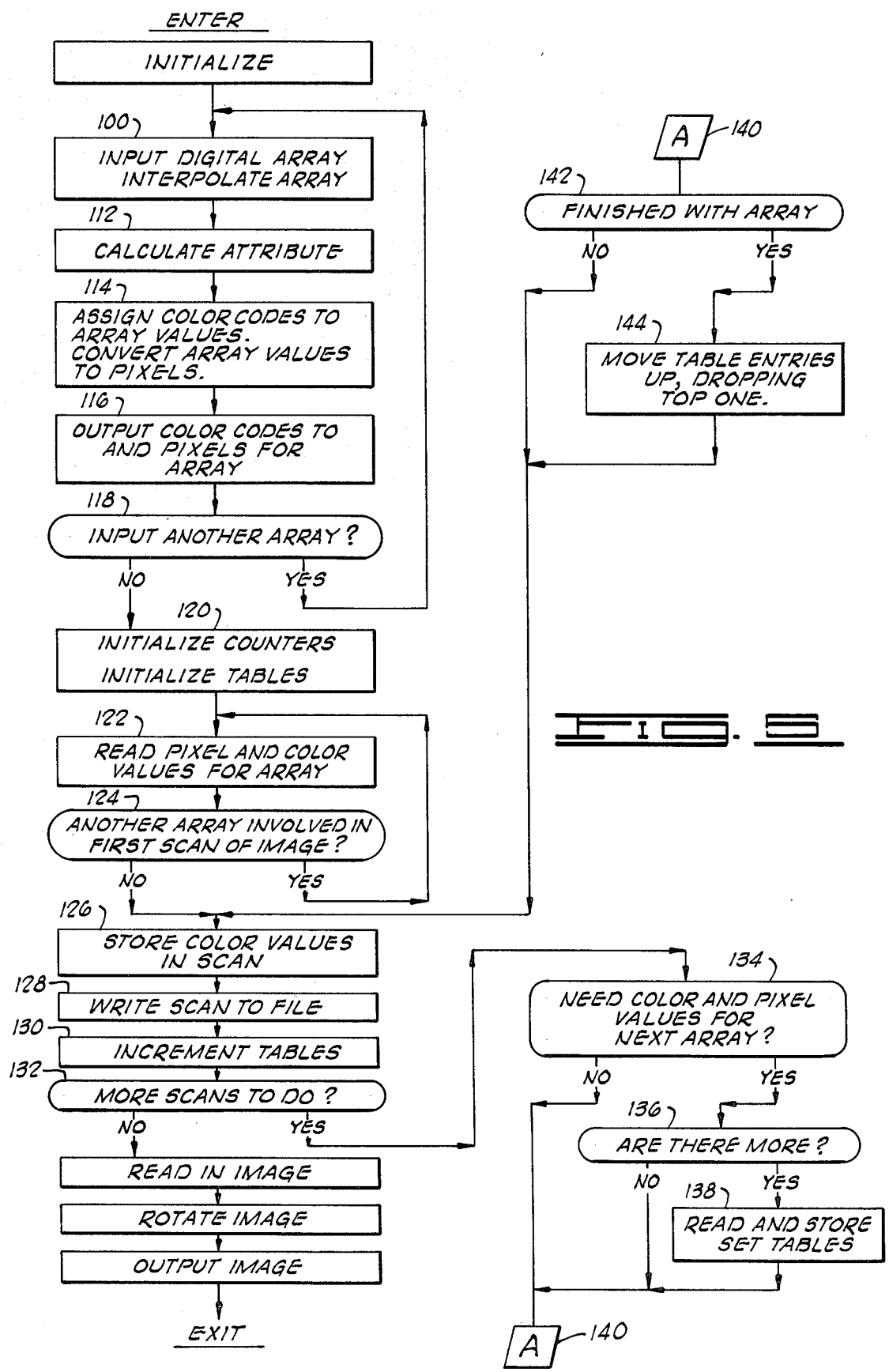
FIG. 5 is a flow diagram of the grid program utilized to assign two-dimensional pixel values to selected geophysical data.

Rasterization of selected sections is carried out in the computer 34 as programmed to carry out the functions illustrated in the flow diagram of FIG. 5. It should be understood that this is but one rasterization program that may be utilized for section rasterization. In effect, the screen is viewed as a 512×512 unit grid and a selected part of a seismic section is overlayed on the grid by feeding into refresh memories 36 horizontal scans containing numbers representing color levels for one of the selected seismic properties or attributes of the section. The digital numbers will lay in the area bounded from the zero line to the peaks and/or troughs of the individual seismic traces. The horizontal scans will then appear one at a time, beginning at the top of the screen, as time for the section will be in the the vertical direction. Up to 510 traces can be displayed simultaneously, and both the distance between the traces, and the maximum horizontal displacement for peak amplitude, can be varied through input set-up of the process.

For example, in order to display the relative amplitude of a seismic trace section, the maximum amplitude of the section is first determined. A color level, ranging from 0 to 255, is then associated with each successive amplitude. The absolute value of the maximum amplitude is assigned a level of 255 and the other amplitudes are assigned color levels relative to the maximum of either the entire section or that portion of a seismic section that is being displayed. The amplitude values of the traces are then converted to values representing grids or pixel units on the screen.

Thus, the locations of zero crossovers along each of the respective seismic traces of the section, in successive manner, are first determined. The maximum color level (or the minimum in the case of a trough) is found between each two zero crossovers. This is done over all of the section so that each sample of the section will have two values associated with it, viz. the amplitude in grid units and a color level. Vertical scans are then generated one at a time by considering the seismic section as a grid with time in the vertical direction. The rightmost scan is generated by scanning the trace amplitude to determine if a trace has amplitudes falling within that vertical grid, then picking up the corresponding color level for that amplitude and placing it in the scan. The spacing between traces and the number of grids a trace is allowed to span determines how many traces must be examined for each scan. Figuratively, as one scan is completed, it is rolled off the section to the right and the next scan is then constructed.

Referring more particularly to FIG. 5, the computer is initialized and receives input of the particular seismic section for interpolation at stage 110. The following flow stage 112 then carries out calculation of the selected attribute, relative amplitude having been the example above, and flow stage 114 functions to assign color codes to the array values and to convert all array values to pixels. The color codes and pixels for the input array are then output at stage 116, and a decision stage 118 queries as to whether or not there is additional array input for the total data. If yes, the program recycles and input stage 110 receives the next successive digital array for interpretation, calculation, etc. All system counters and tables are initialized by stage 120.

Stage 122 then reads all pixel and color values for the array as enabled. Decision stage 124 recycles the operation of reading out pixel and color values as additional arrays are still required to fill out the first scan of image. When all arrays for a scan have been read, the flow stage 126 stores the color values in scan. The flow stages 128 and 130 then write the scan to file and increment the tables, and decision stage 132 queries as to whether or not all scans have been completed. If not, affirmative indication is applied to flow stage 134 to call up color and pixel values for next array. If next array values are needed, affirmative output to stage 136 queries the existence of more stages if there are such, and stage 138 reads and stores the set tables. Program recycling is carried out from a terminal 140 to a decision stage 142 to query array finished whereupon, if finished, stage 144 moves the table entries up while dropping the topmost one. Function then returns to stages 126–132 which functions to write scans to file, and when no more scans are required by decision stage 132 the rasterized image is read out for input to the image computer refresh memory.

Referring again to FIG. 4, the image computer operator has manual control over color mix and the ability to change total contrast of the output display. That is, the operator may exercise control from keyboard 32, track ball 40 and computer front panel controls so that the display can be changed both dynamically and interactively to provide a best interpretive presentation. Adjustments are made empirically in changing the individual attribute data displays to finally arrive at a best presentation output. Thus, the operator may use keyboard or track ball to obtain a best interactive color mix for each attribute; that is, application of selected percentage of each attribute to each color ranging from pure color to a selected mix. Once a desired color mix is obtained, the operator may adjust the tonal contrast of each color separately or collectively. Keyboard control changes the functions of the lookup tables 90-96, i.e. linear, non-linear, etc., so that tonal contrast can be heightened or lessened in selected manner for known amplitude ranges of the input data.

Figure 6:
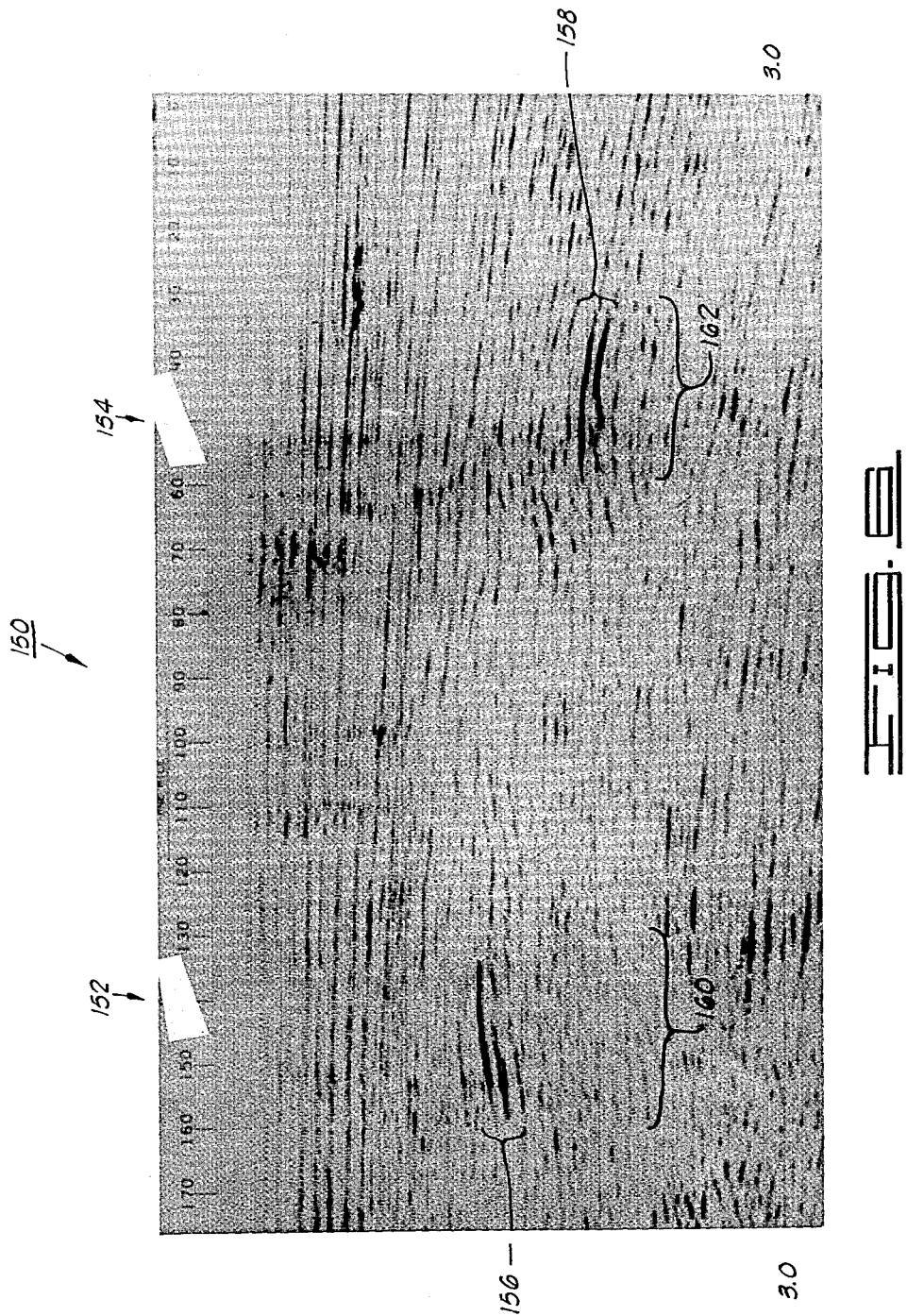
FIG. 6 is an example of a typical seismic survey section.

FIG. 6 shows a typical seismic section 150 that has been selected for illustration purposes. Section 150 is a linear survey section of common depth point stacked information that shows seismic energy down to just below three seconds travel time vertically while the horizontal progression indicates successive shot points along a survey line of eight or ten miles length and designated by units 0–170. This section is selected because it shows two existing producing wells as drilled approximately at locations 152 and 154. The producing strata for the well 152 is within the prominent seismic indication at area 156, while the producing zone for well 154 is indicated by the seismic event aggregation at zone 158. The vertical extremity including the zones 156 and 158 were then excised generally as shown by horizontal brackets 160 and 162 for separate rasterization and interactive color examination.

Figure 7:
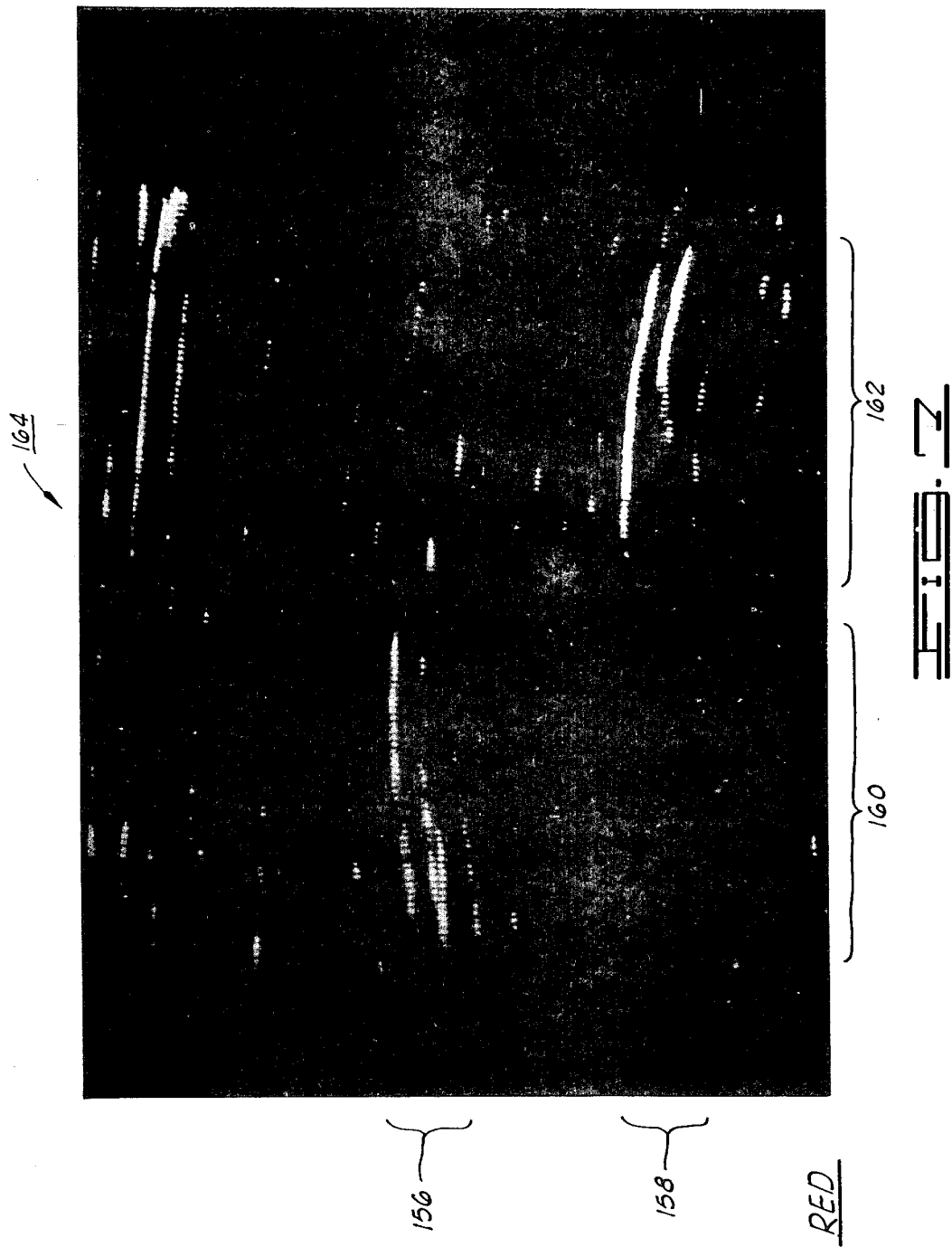
FIG. 7 is a red section display of selected portions of the seismic section of FIG. 6.
Figure 8:
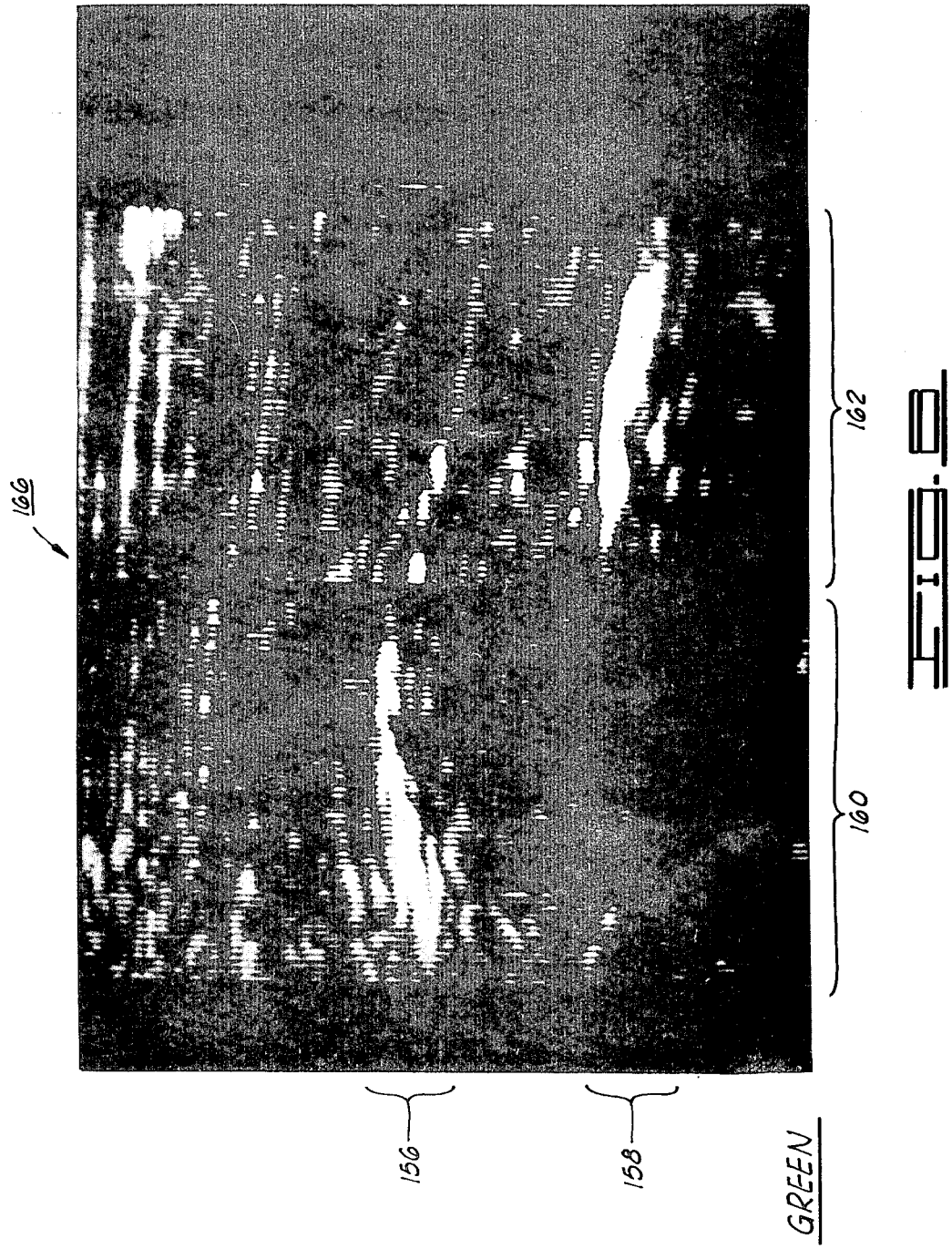
FIG. 8 is a green color display of the selected portions of the seismic section of FIG. 6.

FIG. 7 illustrates, in black and white reproduction, a red color printout 164 of the selected sections 160 and 162. Thus, the red print 164 represents one selected attribute of the seismic sections 160 and 162 as applied to the red processing of color monitor 38 with presentation in pixel or grid form. In the actual photographic reproduction, the black parts of FIG. 7 are truly reproduced while the white portions of FIG. 7 are in bright red as presented on the TV monitor 38. The FIG. 8 reproduction 166 shows the same selected sections 160 and 162, but a different selected attribute of that energy as reproduced on the green electronics of TV monitor 38. In the actual photo, the black portions are black and the white portions of FIG. 8 are green. FIG. 9 then shows reproduction of a photograph showing a blue picture 168, black being black and the white of FIG. 9 being blue in actuality, wherein the same zones and seismic sections 160 and 162 are illustrated for yet a third attribute of the sections as they respond to seismic energy.

FIG. 10 illustrates the three color composite of the red, green and blue reproductions 164–168 as produced for each of three distinct attributes of the seismic energy within selected sections 160 and 162. In the three color picture 170, most of the black of FIG. 10 is colored dark blue while the white of FIG. 10 ranges from white to yellow to teal to lighter blue. It is a practice in interpreting seismic surveys to look for "bright spots" as an indicator of possible producing zones; indication both of the producing zones 156 and 158 were extremely bright and inclusive of a lot of white indication interspersed with some teal blue indication. The zone 156 was white across the upper and lower extremities with a heavy teal central portion thereacross which gave an indication, later to be proven from knowledge of the well itself, that the producing zone was a highly water saturated zone. In like manner, the zone 158 gave strong white indications across the top and bottom with a much lesser mid-portion of teal blue, and the well associated with zone 158 has proven to be a sound producing well.

Figure 11:
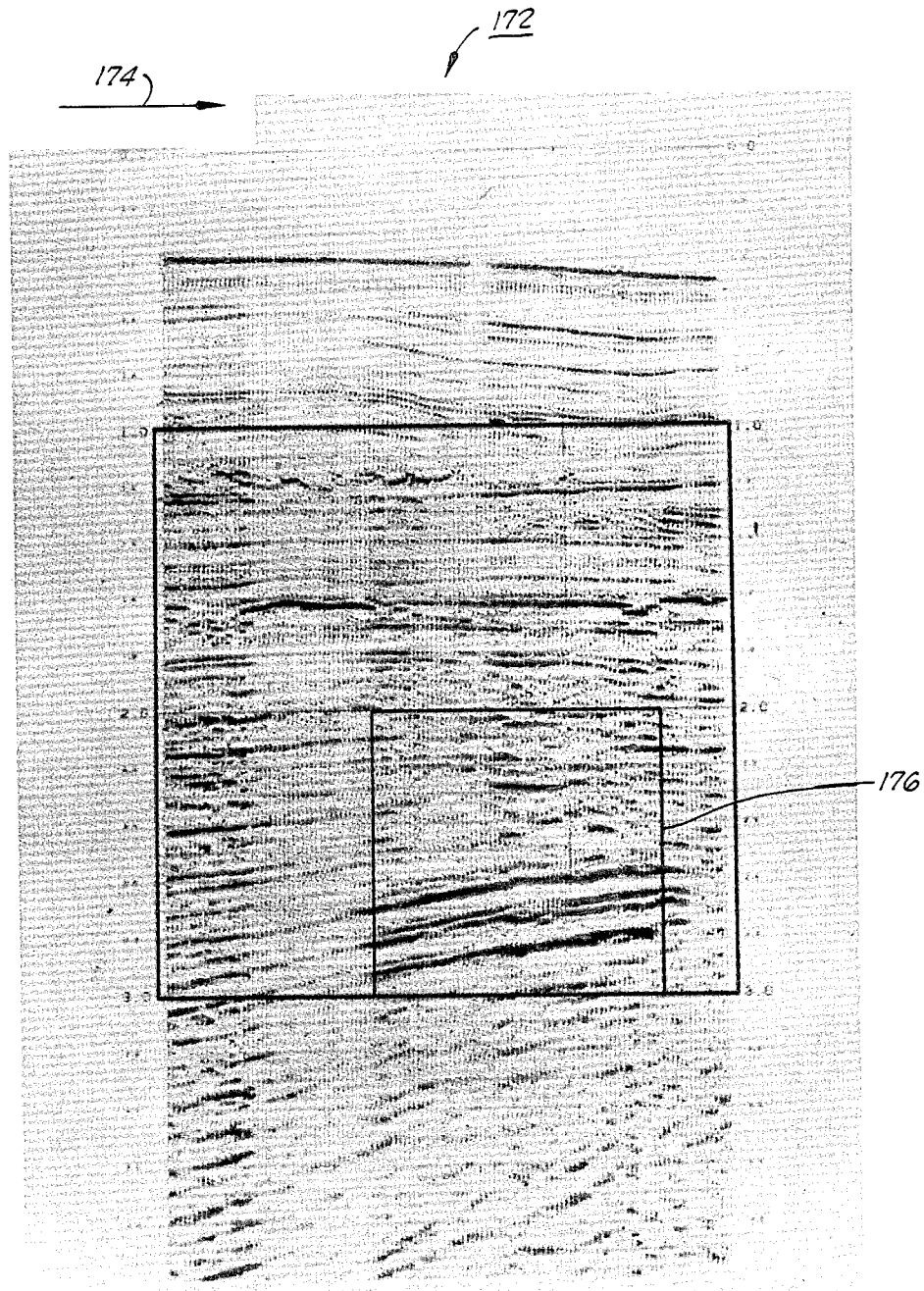
FIG. 11 is a second seismic survey section of typical type.
Figure 12:
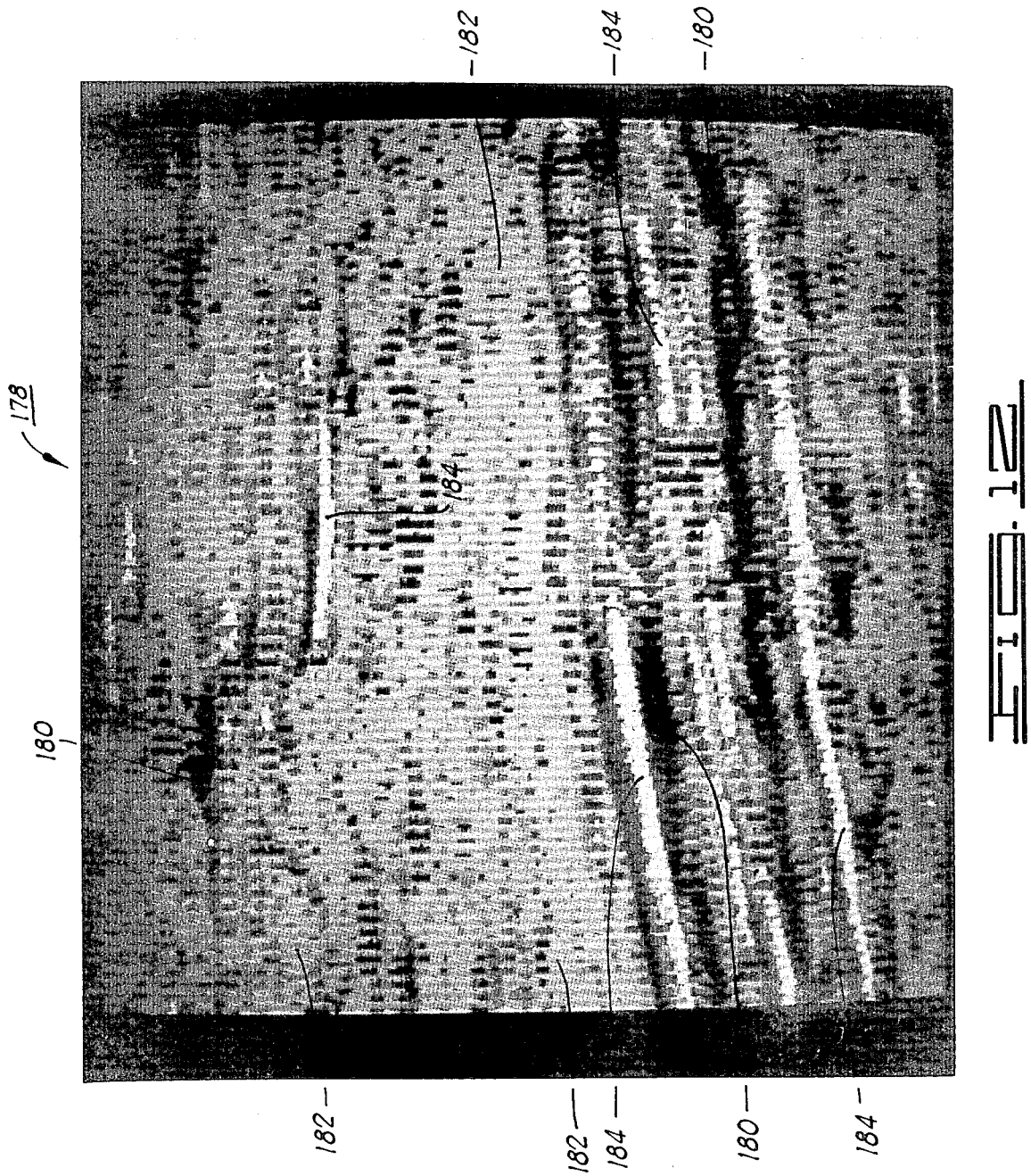
FIG. 12 is a three color display of a selected portion of the seismic section of FIG. 11 illustrating the pixel formation.

FIG. 11 illustrates reproduction of another seismic section 172 taken along a line of survey indicated generally by arrow 174 with recordation of seismic energy down to about four seconds travel time. The display is made up of Common Depth Point information shown in shaded wiggle trace form and serves to give a good event indication of hydrocarbon containing zones in and of itself. However, the portion selected within squared lines 176 was subjected to three color interactive analysis with the selected attributes color assigned (Envelope, Amplitude and Frequency). FIG. 12 is a reproduction 178 of the rasterized, three-color output of the TV monitor 38 for that zone 176 (FIG. 11) after interactive analysis. The reproduction 178 is of particular interest in that it is of a good resolution to illustrate the pixel structure of events and the vertical scan concentration. The dark events such as 180 were of dark blue color. The general background field such as at 182 is a teal green color. Some pink tingeing effect shows up adjacent the white spots, and clearly white spots as indicated by 184 indicate the existence of probable good hydrocarbon producing zones. The left side zones are probable oil zones and the right side zones exhibit teal within the white and strongly suggest gas producing zones.

Figure 13:
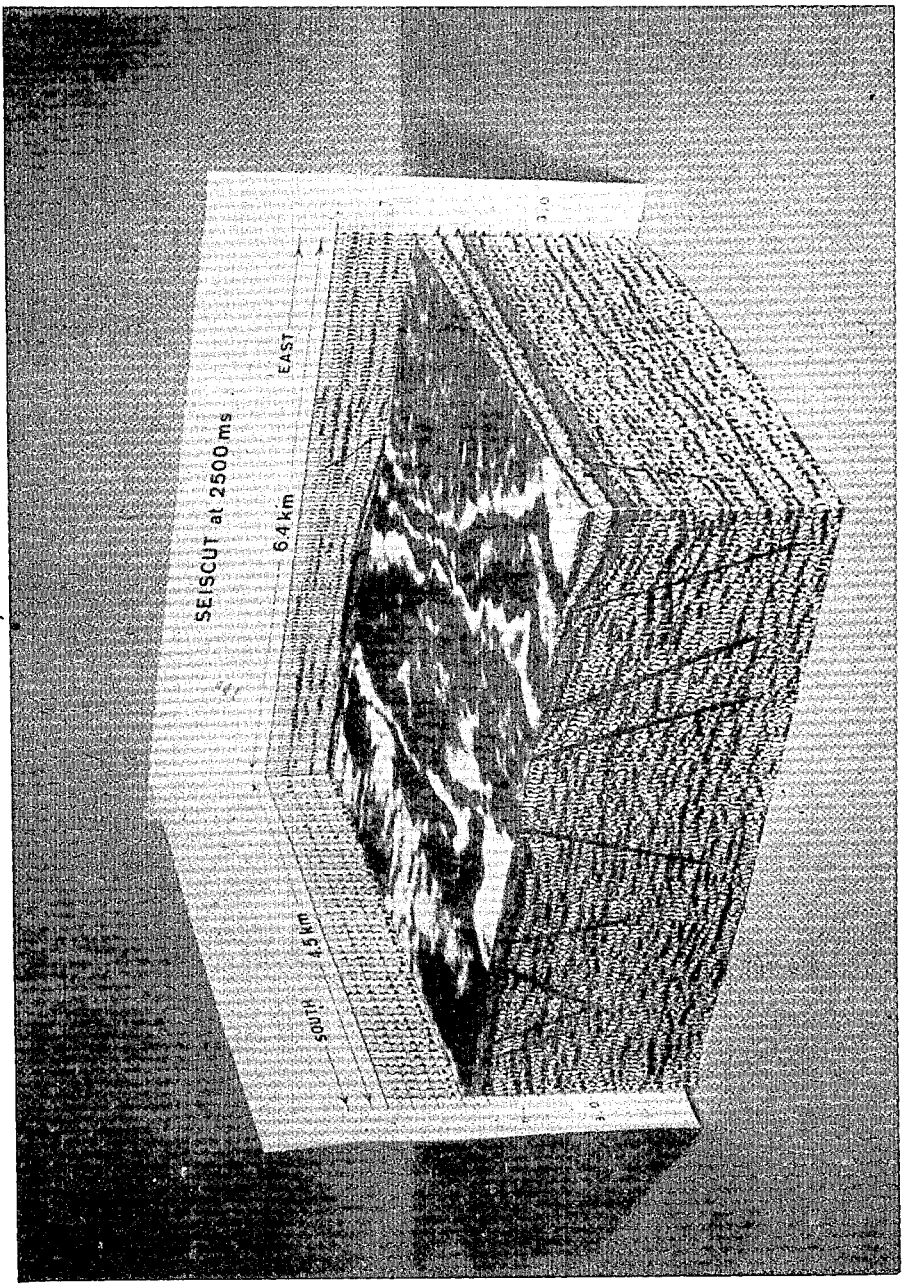
FIG. 13 is a typical form of earth model as formed from three-dimensional seismic data.

Referring to FIG. 13, there is shown a three-dimensional model of terrain as constructed from conventional three-dimensional seismic information. That is, it is common practice today to run a plurality of parallel lines of survey which digital processing then enables to be placed in three-dimensional relationship and output with any selected angular cut or cross-section. For example, a plurality of surveys such as that shown in section 172 of FIG. 11 might be run in the same direction but with each offset relative to the others by a predetermined number of feet, e.g. 220 feet, 440 feet, 880 feet, etc. Such an assemblage of data may then be reproduced as the three-dimensional cut (SEISCUT) of FIG. 13 which shows the vertical data in the conventional shaded wiggle trace but with the horizontal data shown in variable area display at a selected time depth of cut. The isotime model 180 is cut to show the earth structure at 2500 milliseconds.

Figure 14:
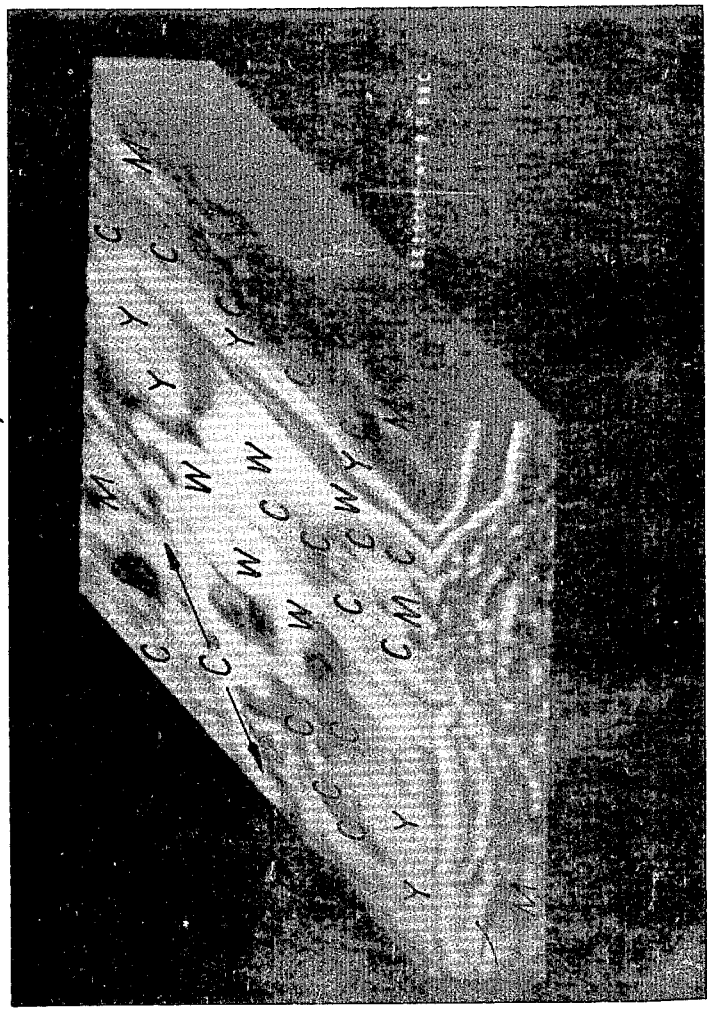
FIG. 14 is a three-dimensional display in three color presentation.

The information of a three-dimensional model 180 is also capable of being interactively color analyzed to provide greater interpretive indication of the earth makeup. FIG. 14 illustrates a three color readout 182 of a 2.5 second time cut in conjunction with the underlying sub-strata. The actual colors as they are reproduced in the TV monitor output are labeled on FIG. 14 with the first letter of the respective colors cyan, yellow, white, and magenta. The vertical depth plane 184 is largely magenta but also showing the associated strata of cyan, white and yellow. The 2.5 second isotime plane of cut and its color contours actually enable classification of the geologic age of the individual strata as well as delineation of a producing sand in the white areas. Hard copy color printouts of the sliced three-dimensional data may be produced in variable density bar form by formatting the output of image computer 25 for input to a conventional Applicon plotter.

Thus, a great number of spatially related data may be quantified and subjected to interactive color analysis in accordance with the present method. The selected attributes utilized in analysis may be related in type; however, this is not necessary since diverse data findings for a related spatial volume may be combined for interactive analysis. For example, for a given earth survey area, it may be desirable to analyze plural attributes of seismic data with a related attribute derived from such as, e.g. magneto telluric, or induced polarization exploration, or well log borehole data that may exist within the survey area.

Interactive color analysis in accordance with the present invention may be carried out with many different forms of data. In addition to seismic data as previously exemplified, it is desirable to simultaneously consider several attributes of data derived from exploration and delineation or production drilling yields. This is especially true of uranium ore bodies and densely drilled oil fields wherein a dense data net is available from the various borehole logs. For example, in a typical uranium ore body, there may be as many as several thousand drill holes on a fifty foot spacing. Each of these holes is logged with downhole tools of well-known type to derive such as spontaneous potential (SP), natural gamma (NG), single point resistance or resistivity, density, etc. In recent years, it has been the practice to record values for each variable or attribute on magnetic tapes for every six-inch interval down hole. This provides an immense data source for the exploration geologist, and full interpretation is now enabled by interactive color analysis. Quantified color output of downhole values recorded for the various tools can reflect rock type and degree of uranium mineralization, as well as formation fluid and oil saturation.

Figure 15:
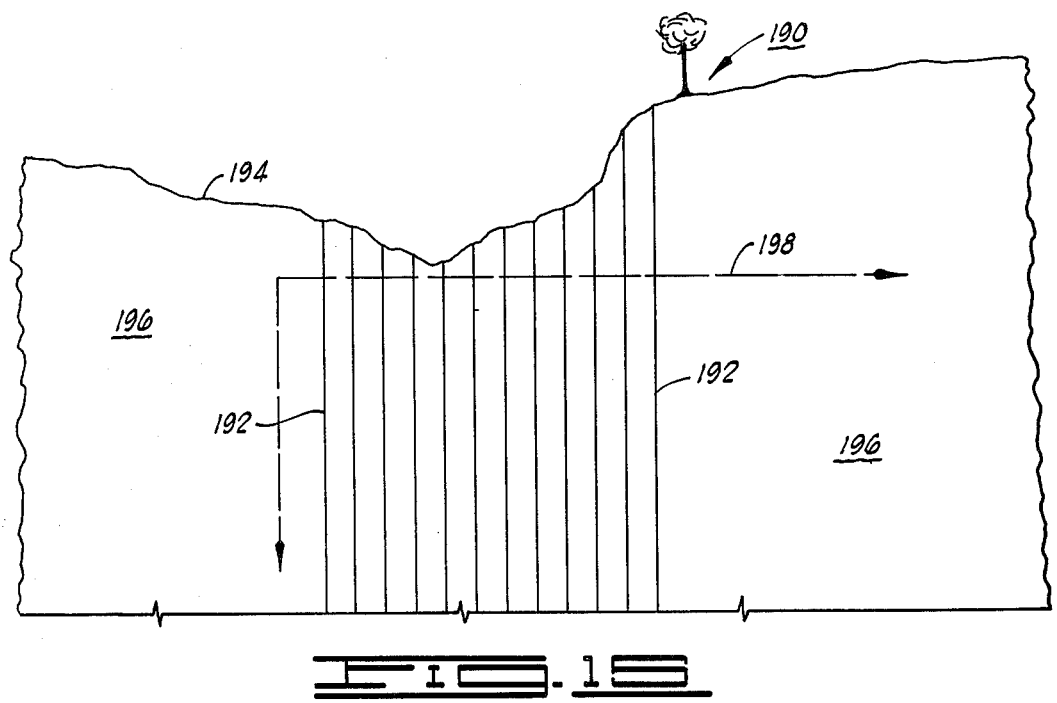
FIG. 15 is a representative earth section showing a typical ore body delineation technique.

Referring to FIG. 15, an idealized partial earth section 190 is shown as it might undergo uranium delineation drilling. It is readily apparent however, that the method could be equally well applied to any form of well log data. The earth section 190 includes a plurality of boreholes 192 formed in surface 194 downward in parallel alignment within earth 196. Borehole instruments are then run down each of the drill holes 192 and the log trace data for the respective parameters is recorded on magnetic tape and digitized for input to the computer 12 for rasterization. In an area of strong uranium mineralization, the natural gamma log has very high values so the logarithm of the gamma values are calculated. Each trace or log has a variable starting depth depending on the elevation of the hole, therefore, each log of SP, NG, resistivity, density and whatever additional attributes, must be corrected to some common higher elevation, e.g. dash line 198, as chosen from the data of the particular site.

In summary, from the raw field data, the following parameters may be calculated by processing and corrected to a common elevation:
 (1) logarithm of natural gamma
 (2) resistance
 (3) change of resistance with depth ($\Delta R/\Delta d$)
 (4) density
 (5) spontaneous potential Data traces for one or more of the above attributes may then be rasterized and input for interactive color processing and display as either a vertical cross-section or, if three-dimensional data is available, as a horizontal cross-section corresponding to a certain elevation relative to sea level. Thus, if attribute traces are derived for a specific elevation relative to sea level for several thousand drill hoes, a norizontal section can be constructed showing the areal relationship of the three chosen variables.

The color attributed to each attribute trace value may be determined from the maximum and minimum values of, for example, the resistance log. A color level ranging from 0–225 would be designated for each amplitude value above the minimum value or "shale line". The shale line is defined as the minimum value on any complete downhole resistance trace, and selected ones of the attribute variables may be assigned color levels as determined by their amplitudes. These color levels are then combined and displayed on the television monitor and image processing computer.

Figures 16, 17:
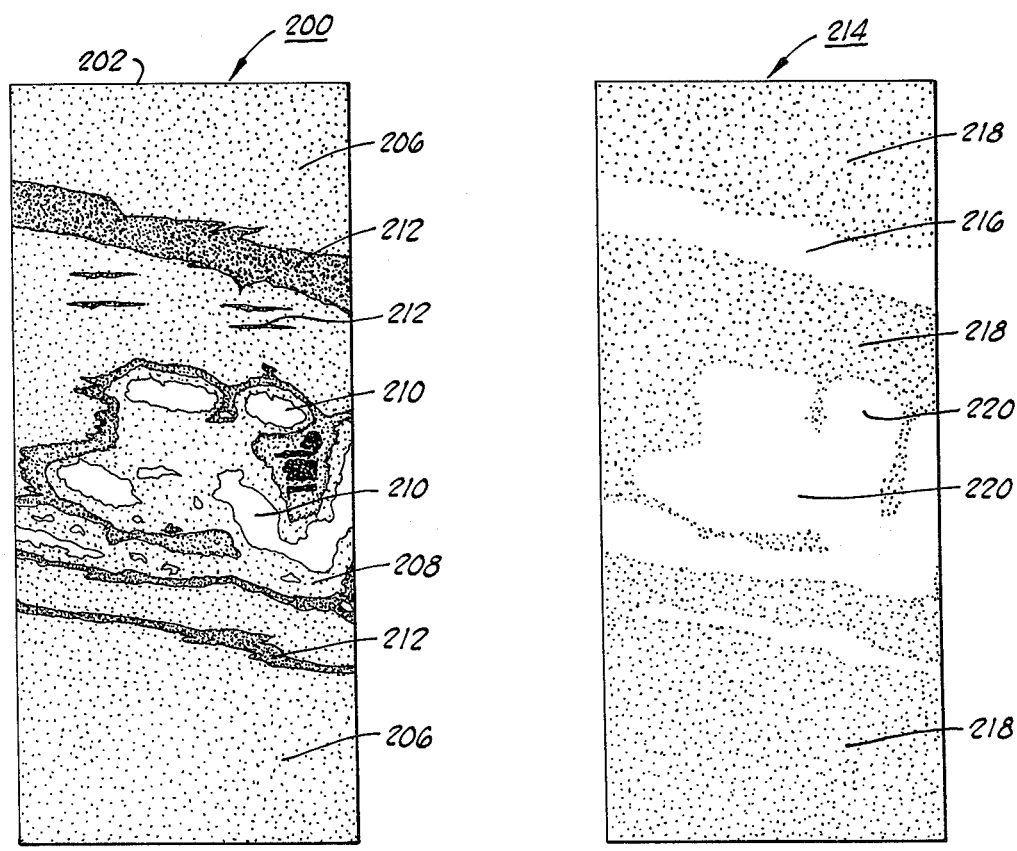
FIG. 16 is a color display of gamma data from delineation drill holes for a known ore body.
FIG. 17 is an interactive color display of gamma and resistivity for the same ore body.

FIG. 16 illustrates interactive color response from the gamma attribute for a series of twelve drilling holes, e.g. similar to that illustrated in FIG. 15. The gamma values were assigned pseudo colors ranging from darkest blue through reds to pure white in accordance with increasing gamma intensity. The vertical cross-section 200 represents a linear section of data coordinated to a selected elevation 202 and displayed along depth coordinate 204. The background of the cross-section 202 is predominantly light magenta, i.e. areas 206, and a delineation of the uranium ore body is shown as a yellow formation 208 with higher gamma intensity white zones 210. Some slightly darker magenta bands 212 indicate the dipping of the rocks within the section of survey.

FIG. 17 illustrates a combined resistance and gamma log section 214 for the same earth section. The gamma log indication was input on the red channel of the TV monitor while the resistance data was input on the blue and green channels of the monitor and then interactively weighted to provide the optimum sectional picture. Again, the dip of the earth section can be seen as moving from left to right as indicated by the upper band 216 (light pink). The main body of the section shows up as dark pink areas 218, and the uranium ore body is clearly delineated in white areas 220.

The interactive analysis method is extremely useful to the interpreter who has an abundance of downhole data recorded as logs. Applications, of course, can be found in any area of geoscience where drill hole data is available; however, some specific applications in uranium exploration are as follows:

(a) lithologic color cross-sections,
(b) data assimilation,
(c) mine sequence maps (horizontal sections),
(d) ore density/mineralization maps (horizontal sections),
(e) interpretation of depositional environments by using areal changes in $\Delta R/\Delta D$,
(f) determination of the position of "gamma front" in drilling areas to assist delineation personnel in determining future drill hole locations (horizontal and vertical sections), and
(g) calculation of uranium ore reserves by correcting the input data from the gamma log for dead time and k factor.

In fact, interactive color analysis may be utilized with diverse forms of geophysical data, the primary requirement being that the data be capable of being organized into a two-dimensional coordinated display suitable for grid presentation.

Interactive analysis can be readily extended into the geologic, geochemical, oil well logging interpretation, etc. areas. For example, in the geologic area, recognition of the display of lithofacies could be aided by loading each color processing channel with grain-size data, quartz content and labile constituents, respectively. Shale could then be coded black, depth could be scaled along one axis of the color print, and the color displayed across the whole print, or by having separated strips, a cross-section built from information from correlated well data could be displayed. Extending this information still further, a colored fence diagram of lithofacies having direct application in exploration could be made. Also, contours and isometric projections from mapping programs and the like would improve the precision of display. Other variables which may be advantageously displayed include: pore size, porosity, permeability, cement and fracture density, and related factors. It should also be noted that qualitative estimates such as high, medium and low porosity can be translated into color intensities for use in individual interactive processing channels, and new variables such as grain/matrix ratio may be readily indicated.

In the field of organic geochemistry, color processing channels could be loaded with data indicating percent organic carbon and hydrocarbon levels and types as obtained from pyrolysis, chromatographic, and mass spectrometer devices. Organic matter type, e.g. amorphous or woody, could also be specifically color processed and employed in displays aimed at better source rock and source reservoir pairs interpretation.

In electrophysical well log analysis, many of the logging responses could be advantageously processed interactively through the color channels, i.e resistivity, porosity and gamma ray response being obvious choices as these would aid in displaying water saturation versus depth plots, estimating oil in place, showing capillary pressure and permeability. Interactive color representation may well be useful in the clearer recognition of sand-body types from logging responses, especially the gamma ray and sonic responses, and resistivity and porosity measurements, as these have definite lithologic connotations and the complex combination of responses could be more readily interpreted using color than by any method currently available. Continuous dip meter log information is similarly complex and is greatly enhanced by interactive color analysis.

The foregoing describes a novel method for interactive color analysis of related types of data. The analysis technique provides a method whereby an operator may continually adjust gridded or rasterized input data through selective color mix and color intensity weighting thereby to bring about a best interpretive presentation for the data collection. The skilled operator is able to interactively analyze the pluralities of related data attributes by empirical process adjustment to provide definitive display of particular properties in question.

Changes may be made in combination and arrangement of steps as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. A method of interactive color analysis of geophysical data utilizing programmed digital computer and image processor to enable interpretive enhancement, comprising:

inputting geophysical data having known spatial relationship relative to a selected plane of investigation, processing said input data to determine at least two selected attributes of said data;

quantifying said processed data in rasterized form where the at least two selected attributes of said data are represented as functions of both area and intensity wherein the attribute value between successive zero cross-overs is represented both in number of grid units within a selected grid scale and the color intensity within a selected intensity range;

displaying said at least two selected attributes of said data in rasterized form in color representation related to said functions of both area and intensity; and interactively varying the relationship between one or more of said functions and the associated color to empirically enhance the color display.

2. A method as set forth in claim 1 where said step of processing includes:

determining three attributes of said input data.

3. A method as set forth in claim 2 wherein said step of displaying includes:

displaying each of said attribute data in rasterized form of a selected different color representation.

4. A method as set forth in claim 1 wherein:
said selected plane of investigation is horizontal.

5. A method as set forth in claim 1 wherein:
said selected plane of investigation is vertical.

6. A method as set forth in claim 1 wherein said step of quantifying includes:

pre-selecting a non-linear transformation of each of the at least two attribute data intensity levels.

7. A method as set forth in claim 1 wherein said step of quantifying includes:

pre-selecting a linear transformation of each of the at least two attribute data intensity levels.

8. A method as set forth in claim 1 which further includes:

varying the color mix as between the three attribute data and inputting a pre-selected color intensity transformation factor.

9. A method as set forth in claim 3 which includes:
determining and inputting at least one additional attribute of said input data; and selectively mixing said at least one additional attribute data with the three attributes of input data.

10. A method as set forth in claim 8 wherein:
said selected plane of investigation is horizontal.

11. A method as set forth in claim 8 wherein:
said selected plane of investigation is vertical.

12. A method for processing seismic data with programmed digital computer and image processor to provide an enhanced display for selective interpretation, comprising the steps of:

processing said seismic data over a selected portion of a seismic section to generate a first attribute weighted grid output of said seismic data as represented both in coordinate grid units within a selected grid scale and relative intensity within a selected intensity range of grid units;

processing said seismic data over said selected portion of seismic section to generate a second attribute weighted grid output of said seismic data as represented both in coordinate grid units within a selected grid scale and relative intensity within a selected intensity range of grid units;

displaying said attribute weighted seismic data grid outputs in overlay with said first and second attribute weighted grid outputs being applied interactively to depict a best empirical variation of selected different primary colors of a color display monitor.

13. A method as set forth in claim 12 which is further characterized to include:

processing said seismic data over a selected portion of a seismic section to generate a third attribute weighted grid output of said seismic data as represented both in coordinate grid units within a selected grid scale and relative intensity within a selected intensity range of grid units; and displaying said third attribute weighted grid output in overlay with said first and second attribute weighted grid outputs.

14. A method as set forth in claim 12 which is further characterized to include:

processing said seismic data over a selected portion of a seismic section to generate at least one additional attribute weighted grid output of said seismic data; and displaying said at least one additional attribute weighted grid output in overlay with said first and second attribute weighted grid outputs.

15. A method for hydrocarbon indicator interpretation of seismic section trace data utilizing a programmed digital computer and image processor comprising:

processing said seismic section trace data to produce rasterized plural replicas of said data which are each weighted in accordance with a selected different parametric attribute of said data, each replica being represented in a grid of values with respective attributes in grid units within a selected grid scale and color level within a selected intensity range; and storing the plural replicas of data;

whereby said rasterized plural replicas of seismic trace data may be reproduced in overlay with each data replica interactively applied in a selected color that is intensity varied in proportion to the respective parametric attribute.

16. A method as set forth in claim 15 wherein:
said selected colors are the three primary colors.

17. A method as set forth in claim 15 wherein said processing includes:

producing the data for each replica wherein the trace data is represented in uniform grid units disposed relative to each trace zero crossover.

18. A method as set forth in claim 17 wherein said processing further includes:

varying color intensity of the trace data as a function of the parametric attribute and designating such color level for each grid unit of said trace data for each replica.

19. A method as set forth in claim 18 wherein said step of varying includes:

pre-selecting a non-linear transformation of said trace data color level.

20. A method as set forth in claim 18 wherein said step of varying includes:
pre-selecting input of a linear transformation of said trace data color level.

21. A method for hydrocarbon indicator interpretation of plural related seismic sections of three-dimensional seismic trace data utilizing a programmed digital computer and an image processor, comprising:
processing said seismic data to generate plural attribute outputs of said data for a selected plane through said three-dimensional seismic trace data;
rasterizing each of said plural attribute outputs to generate a uniform grid output wherein the seismic data for each attribute output is represented as a function of pixel area within a selected grid scale and color intensity within a selected intensity range;
displaying said attribute grid outputs in selected color overlay wherein each attribute grid output is a selected color mix and weight of intensity; and
interactively varying the relationship between one or more of the functions and the associated color to empirically enhance the color display.

22. A method as set forth in claim 21 wherein:
said selected colors are the three primary colors.

23. A method as set forth in claim 22 which further includes:
pre-selecting a non-linear transformation for each attribute grid output color intensity.

24. A method as set forth in claim 22 which further includes:
pre-selecting a linear transformation for each attribute grid output color intensity.

25. A system for processing geophysical data of two-coordinate character to enable enhancement of interpretation utilizing a programmed digital computer and an image processor, comprising:
means for processing and storing plural records of said geophysical data that are each indicative of a selected parametric attribute of said data;
means for rasterizing each of said stored records into a two-dimensional grid wherein individual record indications are represented by a characteristic number of grid units within a selected grid scale and a characteristic color level within a selected intensity range;
means for reproducing each of said rasterized records in a different color and placing the reproduced records in grid unit registration as a plural color overlay reproduction; and
means for interactively varying the relationship between one or more of said record indications to empirically enhance the color display.

26. A system as set forth in claim 25 which further includes:
means for non-linearly transforming color level of at least one parametric attribute of said data.

27. A system as set forth in claim 25 which further includes:
means for linearly transforming color level of at least one parametric attribute of said data.

28. A system as set forth in claim 25 wherein said means for reproducing comprises:
plural display memory means receiving said respective rasterized records;
plural interconnect means providing controlled output of said display memory means; and
color monitor means receiving output from said plural interconnect means.

29. A system as set forth in claim 28 wherein said plural interconnect means comprise:
plural look-up table means each connected to a respective one of said display memory means; and
plural color combining logic means each selectively connectable to at least one of said look-up table means.

30. A system for processing geophysical data of two-coordinate character utilizing a programmed digital computer and an image processor to enable enhancement of interpretation, comprising:
means for storing plural records of said geophysical data that are each indicative of a selected parametric attribute of said data;
means for rasterizing each of said stored records into a two-dimensional grid wherein individual record indications are represented by a characteristic number of grid units within a selected grid scale and color level within a selected intensity range; and
means for storing each of said two-dimensional grids; whereby each of said rasterized records may be interactively reproduced in a different color and placed in grid unit registration as a plural color overlay reproduction.

31. A method for hydrocarbon indicator interpretation of plural related seismic sections of three-dimensional seismic trace data utilizing a programmed digital computer and an image processor, comprising:
processing said seismic data to generate plural attribute outputs of said data for a selected plane through said three-dimensional seismic trace data;
rasterizing each of said plural attribute outputs to generate a uniform grid output wherein the seismic data for each attribute output is represented as a function of pixel area within a selected grid scale and color intensity within a selected intensity range; and
storing said attribute grid outputs for interactive reproduction in selected color overlay wherein each attribute grid output is a selected color mix and weight of intensity.

* * * * *